(12) United States Patent
Cerea

(10) Patent No.: US 7,674,946 B2
(45) Date of Patent: Mar. 9, 2010

(54) METHOD OF REMEDIATING SOIL CONTAMINATED WITH POLYHALOGENATED HYDROCARBONS

(75) Inventor: Giuseppina Cerea, Rozzano (IT)

(73) Assignee: Vomm Chemipharma S.r.l., Rozzano (Milan) (IT)

(*) Notice: Subject to any disclaimer, the term of this patent is extended or adjusted under 35 U.S.C. 154(b) by 209 days.

(21) Appl. No.: 11/719,583

(22) PCT Filed: Nov. 16, 2005

(86) PCT No.: PCT/EP2005/012272

§ 371 (c)(1),
(2), (4) Date: Jun. 22, 2007

(87) PCT Pub. No.: WO2006/053728

PCT Pub. Date: May 26, 2006

(65) Prior Publication Data

US 2009/0067930 A1    Mar. 12, 2009

(30) Foreign Application Priority Data

Nov. 19, 2004  (IT) .......................... MI2004A2242

(51) Int. Cl.
*B09C 1/06* (2006.01)

(52) U.S. Cl. ..................... 588/312; 588/406; 405/128.7

(58) Field of Classification Search .............. 405/128.1, 405/128.7, 128.8, 128.85; 588/312, 406
See application file for complete search history.

(56) References Cited

U.S. PATENT DOCUMENTS

| 5,197,823 | A * | 3/1993 | Cutshall et al. ......... 405/128.75 |
| 5,658,094 | A * | 8/1997 | Clawson ................. 405/128.85 |
| 6,213,030 | B1 * | 4/2001 | Robertson et al. ........... 110/246 |
| 2002/0025227 | A1 * | 2/2002 | Cerea ..................... 405/128.8 |

FOREIGN PATENT DOCUMENTS

| EP | 1 170 067 | 1/2002 |
| WO | WO 89/09638 | 10/1989 |

* cited by examiner

*Primary Examiner*—John Kreck
(74) *Attorney, Agent, or Firm*—Lucas & Mercanti, LLP

(57) ABSTRACT

Method of remediating a soil contaminated by polyhalogenated hydrocarbons, in particular PCBs, PCDDs and PCDFs, comprising the steps of removing and sieving the soil to free it of stones and gravel; possibly regulating the moisture content of the sieved soil to a value of 10-30%; subjecting the sieved soil to thermal treatment while it flows in the form of a thin, turbulent, dynamic layer in contact with a wall heated to at least 250° C.; separating the thermally treated soil from the steam generated following such treatment, the soil being substantially free of the aforementioned polyhalogenated hydrocarbons.

10 Claims, 2 Drawing Sheets

METHOD OF REMEDIATING SOIL CONTAMINATED WITH POLYHALOGENATED HYDROCARBONS

This patent application claims the benefit of priority from Italian Patent Application No. MI2004A002242 filed Nov. 19, 2004 though PCT Application Serial No. PCT/EP2005/012272 filed Nov. 16, 2005, the contents of each of which are incorporated herein by reference.

FIELD OF APPLICATION

The present invention relates generally to the technical field of environmental remediation.

In particular, the invention relates to a method of remediating soil contaminated by halogenated hydrocarbons and in particular by polychlorobiphenyls (PCBs), polychlorodibenzodioxins (PCDDs) and/or polychlorodibenzofurans (PCDFs).

BACKGROUND ART

Polyhalogenated hydrocarbons and in particular the polychlorobiphenyls are substances widely employed in industry for their useful properties, including their considerable stability upon heating and pressure application.

Such substances are nevertheless very toxic for the flora and fauna, and their leakage into the soil may lead to serious environmental risks. It has already occurred that, following the accidental outflow of PCBs and their degradation products, such as polychlorodibenzodioxins (PCDDs) and polychlorodibenzofurans (PCDFs) from plants for the production of polyhalogenated hydrocarbons (for example insecticides), access has been prohibited to even quite vast land areas, also in urban environments.

Different methods of remediating soils contaminated by PCBs and/or PCDDs and PCDFs have been proposed, some based on chemical reactions (see for example U.S. Pat. No. 5,197,823 and US 2002143226) conducted on the soil, others based on the absorption by a polymeric support after grinding the soil and admixing it with water and with the aforementioned support (see FR 2 797 598), still others based on treatments with solvents (U.S. Pat. No. 4,801,394).

These methods are quite complicated and costly from the standpoint of both plant design and energy consumption. Moreover, such methods do not lend themselves to being carried out in place but require the removal of the contaminated soil and its transportation by trucks to the remediation plant.

U.S. Pat. No. 5,658,094 discloses a system for remediating soil contaminated with hydrocarbons and PCB's, which system includes a rotary drum having first and second heat exchanging regions, each containing separated inner and outer regions. The drum is inclined so that the fed soil is gravitationally urged through the inner regions, whereas thermal energy provided by burner means remediates the soil by vaporizing and oxidizing the hydrocarbons and PCB's in a stream of hot gases. Temperatures as high as 2000° F. (1093° C.) are reached.

EP-A-1 170 067 discloses a method of remediating soil that contains heavy metals, comprising the step of treating a sieved soil in a thin layer, kept in a strongly turbulent state, with a solution of an alkali sulfide at a temperature of at least 50° C.

U.S. Pat. No. 6,213,030 describes an apparatus for the treatment volatile materials in contaminated materials including a retort assembly which includes a rotatable retort disposed at least partially within a combustion chamber with a heater to indirectly heat the contents of the rotatable retort.

SUMMARY OF THE INVENTION

The problem underlying the present invention was therefore that of making available a method of remediating soils contaminated with polyhalogenated hydrocarbons, in particular PCBs, PCDDs and PCDFs which may be carried out in situ with low energy consumption, without the use of chemical reagents and with an apparatus characterised by low installation and management costs.

The problem was solved, according to the invention, by a method comprising the steps of:

removing and sieving a soil containing polyhalogenated hydrocarbons, in particular PCBs and PCDDs and/or PCDFs to remove stones and gravel;

possibly adjusting the moisture content of such sieved soil to a value of 10-30%;

subjecting such soil to thermal treatment while it flows in the form of a thin, turbulent and dynamic layer in contact with a wall heated to at least 250° C.;

separating the thermally treated soil from the steam generated following such treatment, said soil being substantially free of the aforementioned polyhalogenated hydrocarbons, which have been removed together with the steam.

Conveniently, the method according to the invention may be carried out with the aid of an apparatus named turbo-heater, comprising a cylindrical tubular body, provided with a heating jacket, closed by end walls at its opposite ends, provided with at least one inlet opening and at least one outlet opening and onto the interior of which a coaxial bladed rotor is rotatably supported. In this case, the inventive method comprises the steps of:

removing and sieving soil containing polyhalogenated hydrocarbons, in particular PCBs and PCDDs and/or PCDFs to remove stones and gravel;

possibly adjusting the moisture content of such sieved soil to a value of 10-30%;

feeding a continuous stream of said soil into the aforementioned turbo-heater, the wall temperature of which is at least 250° C., subjecting the soil stream to the mechanical action of the bladed rotor placed in rotation at a speed of at least 150 rpm, with consequent centrifugation of the aforementioned soil against the heated wall, which determines the instantaneous generation of a steam stream, and conveyance of said soil and steam streams toward said at least one outlet opening, continuously discharging a soil stream having a moisture content of less than 1% and substantially free of said halogenated hydrocarbons.

The steam stream exiting from the turbo-heater is directed to a washing and cooling scrubber; from the exit of the latter a liquid stream is obtained containing the polyhalogenated hydrocarbons removed from the soil, along with a steam stream which is directed to additional removal steps.

The liquid exiting from the scrubber may ultimately be directed, possibly once it has been concentrated by reverse osmosis, to elimination in appropriate incinerators adapted to the treatment of PCBs, PCDDs and PCDFs.

The rotation speed of the bladed rotor is preferably 150 to 1,500 rpm.

The soil input flow rate in the turbo-heater is generally comprised between 1,000 and 10,000 kg/h.

The wall temperature is preferably maintained at approximately 250-290° C. and the average residence time of the soil in the turbo-heater varies between 2 and 30 minutes.

The soil exiting from the turbo-heater generally has a temperature of approximately 220-250° C. and a moisture content of less than 1%, typically around 0.4-0.6%.

When a soil contaminated with PCBs is subjected to the method of the invention, the PCBs content is reduced approximately 100-fold, so that it is brought to values of the order of a few micrograms per kg, which are considered safe according to current regulations.

It should be underlined that the method according to the invention may be advantageously carried out in situ, since the necessary apparatuses are easily installable on the flatbeds of trucks and may therefore be brought to the site to be remediated. This permits avoiding the considerable costs due to the handling and transportation of large quantities of soil from the site to be remediated to the disposal plants.

Moreover, the energy consumption connected with the remediation treatment carried out with the present method is decidedly low, since it may be calculated that for the remediation of 10,000 kg/h of a soil with 10% moisture content, approximately 2,500,000 kcal/h and 200 kW are required.

Further advantages and characteristics of the method according to the present invention shall more clearly result from the description of one of its embodiments, provided here below as an illustrative and non-limiting example, with reference to the attached drawings, which illustrate in a schematic manner a device for the execution of the present method.

DETAILED DESCRIPTION OF THE INVENTION

Figure 1:
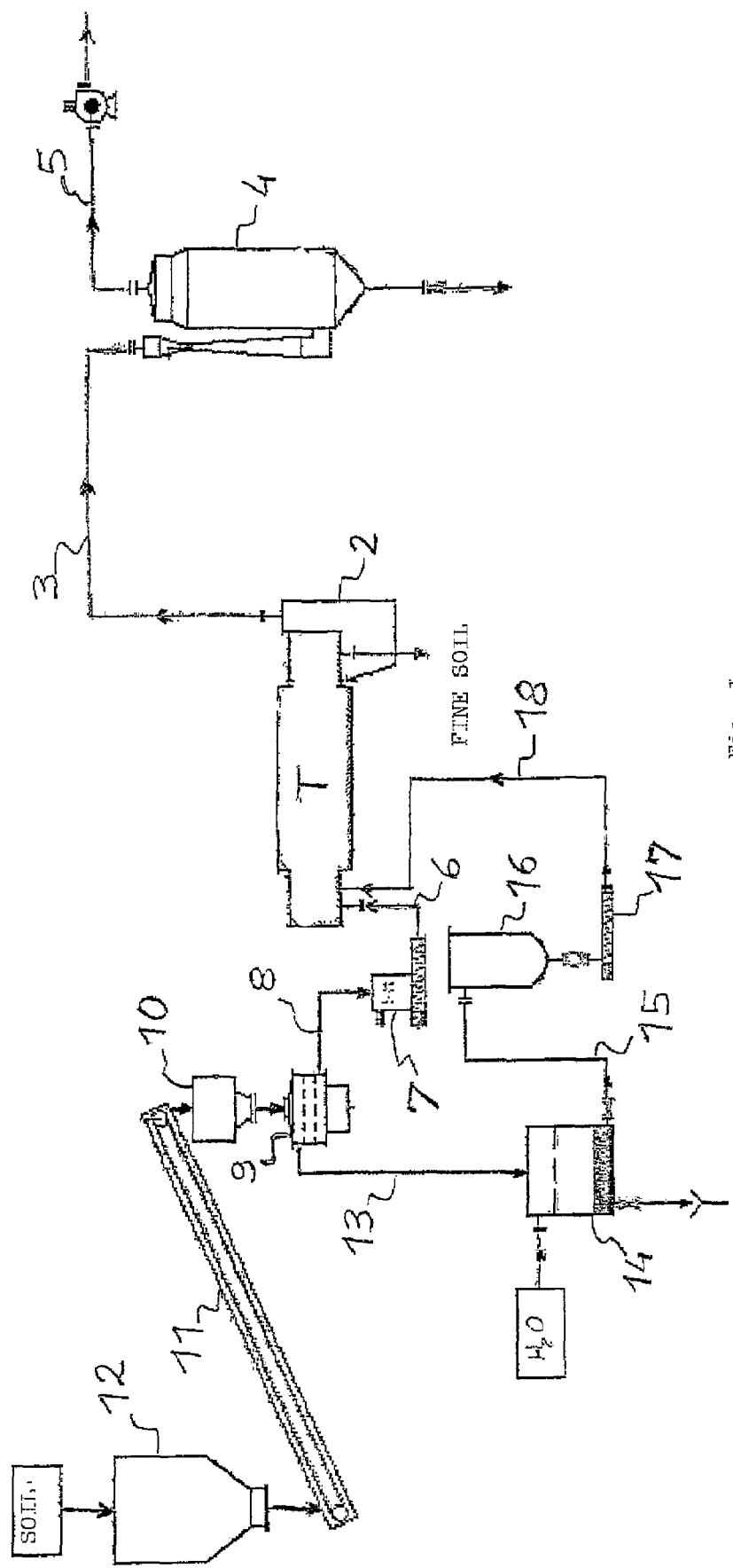
FIG. 1 illustrates in a schematic manner a plant for the execution of the present method and FIG. 2 schematically illustrates the turbo-heater of the aforementioned plant.
Figure 2:
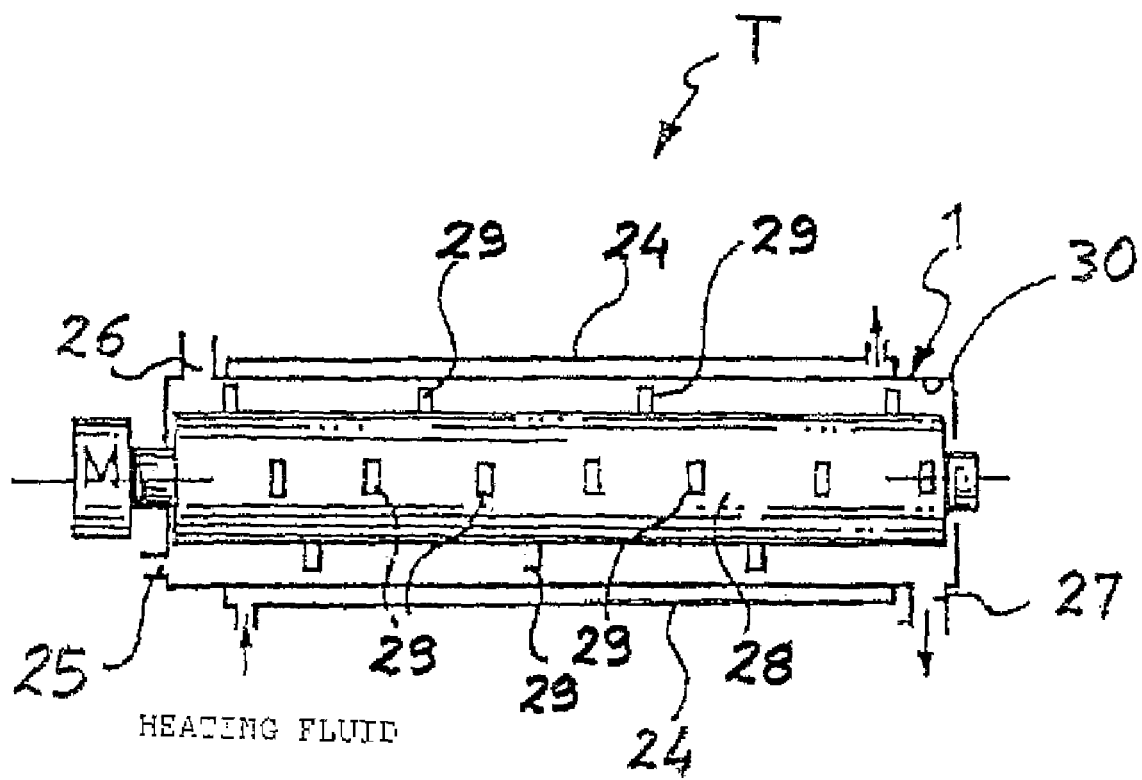

With reference to FIG. 1, it may be seen that an exemplifying plant for carrying out the process according to the present invention comprises a continuous turbo-heater T, connected by means of a steam conveyance hood 2 and a conduit 3 to a scrubber 4, from which an outlet conduit 5 departs which leads to additional gas flow purification devices.

It may be further seen in FIG. 1 that the turbo-heater T is also connected, through a conduit 6, to a soil doser 7, which is in turn connected through a conduit 8 to a sieve 9. The latter is in communication with a crusher 10 for the soil fed to it by means of the conveyor 11 and the hopper 12.

The sieve 9 is also connected, through a conduit 13, to a stone and gravel washer 14, in turn connected through a conduit 15 to a washing water collection tank 16. This latter is connected to a washing water feed pump 17, which is in fluid communication through a conduit 18 with the turbo-heater T.

The turbo-heater T (produced, for example, by the company VOMM Impianti e Processi of Rozzano (Milan)) essentially comprises a cylindrical tubular body 1 closed by end walls at its opposing ends 22, 23 and provided with a coaxial heating jacket 24 through which a fluid, such as e.g. diathermic oil, is made to flow.

The tubular body 1 has an inlet opening 25 for the soil to be treated, an inlet opening 26 for the washing waters, and an outlet opening 27 for the treated soil and the steam.

Inside the tubular body 1, a bladed rotor 28 is rotatably supported the blades 29 of which extend radially until they graze the inner wall 30 of the cylindrical body 1. The blades 29 of this rotor are helically arranged and oriented so to centrifuge and simultaneously transport the product subjected to treatment toward the outlet. A motor M rotates the rotor 28 at a speed comprised between 150 and 1,500 rpm, preferably 300-600 rpm.

When the plant schematically described above is utilized, the method according to the invention is carried out as follows.

The soil contaminated by PCBs, PCDDs and/or PCDFs is fed through the hopper 12 to the conveyor belt 11, which transfers it to the clod crusher 10. The soil exiting from the crusher 10 arrives at the sieve 9, in which there occurs the separation of the fine soil (particle size less than 3 mm) from the stones and gravel.

The fine soil exiting from the sieve 9 is directed through the conduit 8 to a dosing device 7, which feeds it, through the conduit 6 and the opening 25, to the turbo-heater T.

The stones and gravel exiting from the sieve 9 are instead directed through the conduit 13 to the washer 14, in which they are washed with water. The washing waters are directed through the conduit 15 to the tank 16 and from this, by means of the pump 17 and the conduit 18, they are fed to the turbo-heater T through the opening 26.

The stones and gravel are ultimately discharged from the washer 14.

The fine soil stream is therefore continuously fed into the turbo-heater T through the inlet opening 25, simultaneously and in co-current with a stream of washing water coming from the tank 16, dosed at such a flow rate as to bring the moisture content of the fine soil to a value of 10-30%. Upon its entry into the turbo-heater, the fine soil is centrifuged by the rotor blades against the heated inner wall 30, closely mixed with the stream of washing water and simultaneously conveyed toward the outlet opening 27 thanks to the helical orientation of the aforementioned blades.

Thanks to the formation of a thin tubular, dynamic and turbulent layer of fine soil, in which the material particles absorb a very large amount of bladed rotor placed in high speed rotation and in the form of heat yielded by the inner heated wall of the turbo-heater T, there occurs an instantaneous and violent vaporisation of the water bound to each particle. The generated steam also carries with it most of the organic compounds which may be volatilized in a current of steam.

After a residence time in the dryer of between 2 and 30 minutes, a fine soil stream is continuously discharged with a moisture content of less than 1% and a steam stream, which is conveyed through the hood 2 and the conduit 3 to the scrubber 4.

The condensate collected in the scrubber 4 is directed to a concentration step, for example by reverse osmosis, and to subsequent disposal in appropriate incinerators.

The steam exiting from the scrubber is instead directed to additional removal steps, by for example glycolated water condensation batteries and additional removal scrubbers. The water collected by these latter removal devices is also collected, concentrated and directed to disposal.

EXAMPLE 1

Utilising the device schematically described above and following the method of the invention, soil coming from an area contaminated with PCBs, PCDDs and PCDFs having a water content of approximately 10% was subjected to remediation.

Such soil had a content of fine soil (particles smaller than 3 mm) equal to 50.2% of the weight, gravel or grit (larger than 3 mm) 16.4%, stones and bricks 32.0% and grass 1.4%.

The fine soil contained a total amount of PCBs equal to 1.18 mg/kg and a total content of PCDDs and PCDFs equal to 0.578 µg/kg.

The clods taken from the contaminated area were loaded in the hopper 12 and fed from this to the clod crusher 10 by means of the conveyor 11. The material exiting from the crusher was separated by the sieve 9 into a fine soil fraction (size<3 mm) and a gravel and stones fraction (size>3 mm).

The fine soil was fed, by means of the doser 7, to the turbo-heater T, at a flow rate of 10,000 kg/h.

The stones and gravel exiting from the sieve 9 were washed with water inside the washer 14 and the washing waters were collected in the tank 16, from which, by means of the pump 17, a continuous stream of such waters was fed into the turbo-heater T at a flow rate such to bring the moisture content of the fine soil in the entry zone of the turbo-heater to a value of approximately 20%.

The temperature of the inner wall of the cylindrical tubular body 1 was maintained at approximately 290° C., by means of diathermic oil circulating in the heating jacket 24, while the rotation speed of the bladed rotor 25 was maintained constant at 250 rpm.

After an average residence time in the turbo-heater T of 20 minutes, a continuous stream of fine soil and steam was discharged.

The fine soil had a moisture content of 0.6%, a PCBs content equal to 15.4 µg/kg and content of PCDDs and PCDFs equal to 0.20 µg/kg.

The steam stream exiting from the turbo-heater was conveyed through the hood 2 and the conduit 3 to the scrubber 4, composed of a turbo-scrubber of the type described in patent application EP-A-749 772.

The liquid collected from the scrubber had a total PCBs content equal to 645 µg/l.

The steam exiting from the scrubber was finally directed to an additional scrubber and the liquid collected from this latter scrubber had a total PCBs content equal to 0.61 µg/l, which demonstrates that the first scrubber permitted the recovery of nearly all of the PCBs removed from the soil.

The PCBs content of the soil treated with the method of the invention is fully within the limits foreseen by current regulations.

EXAMPLE 2

Clods taken from the same soil as that of example 1 were loaded in the hopper 12 and fed from this to the clod crusher 10 by means of the conveyor 11. The material exiting from the crusher was separated by the sieve 9 into a fine soil fraction (size<3 mm) and a gravel and stones fraction (size>3 mm).

The fine soil was fed, by means of the doser 7, to the turbo-heater T, at a flow rate of 10,000 kg/h.

The stones and gravel exiting from the sieve 9 were washed with water inside the washer 14 and the washing waters were collected in the tank 16, from which, by means of the pump 17, a continuous stream of such water was fed into the turbo-heater T at a flow rate such to bring the moisture content of the fine soil in the entry zone of the turbo-heater to a value of approximately 18%.

The temperature of the inner wall of the cylindrical tubular body 1 was maintained at approximately 270° C., by means of diathermic oil circulating in the heating jacket 24, while the rotation speed of the bladed rotor 25 was maintained constant at 350 rpm.

After an average residence time in the turbo-heater T of 30 minutes, a continuous stream of fine soil and steam are discharged.

The fine soil had a moisture content of 0.4%, a PCBs content equal to 16.7 µg/kg and content of PCDDs and PCDFs equal to 0.25 µg/kg.

The steam stream exiting from the turbo-heater was conveyed through the hood 2 and the conduit 3 to the scrubber 4, composed of a turbo-scrubber of the type described in patent application EP-A-749 772.

The liquid collected from the scrubber had a total PCBs content equal to 630 µg/l.

The steam exiting from the scrubber was finally directed to an additional scrubber and the liquid collected from this latter scrubber had a total PCBs content equal to 0.58 µg/l, which demonstrates that the first scrubber permitted the recovery of nearly all of the PCBs removed from the soil.

Also in this case, the PCBs content of the soil treated with the method of the invention is fully within the limits contemplated by current regulations.

The invention claimed is:

1. A method of remediating a soil contaminated with polyhalogenated hydrocarbons, comprising the steps of:
   (a) removing and sieving said soil to remove stones and gravel;
   (b) regulating the moisture content of said sieved soil to a value of 10-30%;
   (c) feeding a continuous stream of said soil into a turbo-heater (T) comprising a cylindrical tubular body closed by end walls at its opposite ends, provided with a heating jacket, at least one inlet opening, at least one outlet opening and an inner wall, and onto the interior of which a coaxial bladed rotor is rotatably supported, the temperature of the inner wall being 250°-290° C.,
   (d) subjecting the soil stream to the mechanical action of said bladed rotor rotated at a speed of at least 200 rpm, with the consequent centrifugation of said soil against said heated wall, which determines the instantaneous generation of a steam stream, and conveyance of said soil and steam streams towards said at least one outlet opening, and
   (e) continuously discharging a soil stream having a moisture content of less than 1% and substantially free of said polyhalogenated hydrocarbons.

2. The method according to claim 1, wherein the rotation speed of the bladed rotor is between 200 and 1,500 rpm.

3. The method according to claim 1, wherein the flow rate of the soil stream entering into the turbo-heater (T) is between 1,000 and 10,000 kg/h.

4. The method according to claim 1, comprising the additional step of subjecting said stones and gravel to washing with water and feeding a continuous stream of the resulting washing waters into the turbo-heater (T) in co-current with said soil stream, at a flow rate such to bring the moisture content of said soil near to said at least one inlet opening to a value of 10-30%.

5. The method according to claim 4, comprising the further step of sending said steam stream exiting from said turbo-heater (T) to a condensation step and directing the resulting condensate to a disposal step by incineration.

6. The method according to claim 5, wherein said condensate, before being directed to said disposal step, is subjected to concentration.

7. The method according to claim 6, wherein the concentration of said condensate is carried out by means of reverse osmosis.

8. The method according to claim 4, wherein the rotation speed of the bladed rotor is between 200 and 1,500 rpm.

9. The method according to claim 4, wherein the flow rate of the soil stream entering into the turbo-heater (T) is between 1,000 and 10,000 kg/h.

10. The method according to claim 1, wherein the polyhalogenated hydrocarbons is selected from the group consisting of PCBs, PCDDs and PCDFs.

* * * * *